(12) United States Patent  
Hashimoto

(10) Patent No.: US 8,412,008 B2
(45) Date of Patent: Apr. 2, 2013

(54) SEMICONDUCTOR OPTICAL DEVICE

(75) Inventor: Jun-ichi Hashimoto, Yokohama (JP)

(73) Assignee: Sumitomo Electric Industries Ltd., Osaka (JP)

( * ) Notice: Subject to any disclaimer, the term of this patent is extended or adjusted under 35 U.S.C. 154(b) by 225 days.

(21) Appl. No.: 13/038,719

(22) Filed: Mar. 2, 2011

(65) Prior Publication Data

US 2011/0235971 A1    Sep. 29, 2011

(30) Foreign Application Priority Data

Mar. 24, 2010 (JP) ................................. 2010-068802

(51) Int. Cl.
*G02B 6/12* (2006.01)
*G02B 6/26* (2006.01)

(52) U.S. Cl. .................. 385/14; 385/31; 385/1; 385/2; 385/129; 385/130; 385/131; 385/132; 385/45

(58) Field of Classification Search .................. 385/1, 2, 385/3, 14, 31, 39, 40, 41, 42, 45, 129, 130, 385/131, 132

See application file for complete search history.

(56) References Cited

U.S. PATENT DOCUMENTS

| | | | | |
|---|---|---|---|---|
| 5,754,714 A | * | 5/1998 | Suzuki et al. | 385/5 |
| 6,954,568 B2 | * | 10/2005 | Liu | 385/45 |
| 2004/0218868 A1 | * | 11/2004 | Liu | 385/45 |
| 2011/0235961 A1 | * | 9/2011 | Hashimoto | 385/3 |
| 2011/0235971 A1 | * | 9/2011 | Hashimoto | 385/31 |

FOREIGN PATENT DOCUMENTS

| | | |
|---|---|---|
| JP | 62-183406 | 8/1987 |
| JP | 2005-99387 | 4/2005 |

OTHER PUBLICATIONS

C. Rolland et al., "10 Gbit/s, 1.56μ Multiquantum Well InP/InGaAsP Mach-Zehnder Optical Modulator", Electronics Letters, vol. 29, No. 5, Mar. $4^{th}$, pp. 471-472, 1993.

* cited by examiner

*Primary Examiner* — Brian Healy
(74) *Attorney, Agent, or Firm* — Smith, Gambrell & Russell, LLP

(57) ABSTRACT

A semiconductor optical device includes a first optical waveguide including first, second, and third sections; a second optical waveguide including fourth, fifth, and sixth sections; an input optical coupler; and an output optical coupler. The first and second optical waveguides and the input and output optical couplers each include a first cladding layer composed of an n-type semiconductor and a core layer. The second and fifth sections each include an intermediate semiconductor layer on the core layer, and a second cladding layer composed of an n-type semiconductor. The first, third, fourth, and sixth sections and the input and output optical couplers each further include a third cladding layer on the core layer. At least one of the third cladding layers includes a first cladding section on the core layer and a second cladding section on the first cladding section. The second cladding section is composed of a semi-insulating semiconductor.

12 Claims, 14 Drawing Sheets

SEMICONDUCTOR OPTICAL DEVICE

BACKGROUND OF THE INVENTION

1. Field of the Invention

The present invention relates to semiconductor optical devices.

2. Description of the Related Art

Patent Document 1 (Japanese Unexamined Patent Application Publication No. 62-183406) describes a waveguide-type optical interferometer. This waveguide-type optical interferometer includes a substrate, two optical guides composed of glass or a plastic formed on the substrate, two optical couplers that connect the optical waveguides to each other at different positions, and phase shifters disposed in the optical waveguides between the optical couplers. Each phase shifter includes a heater disposed on the optical waveguide. The optical path length of the optical waveguide is changed by controlling the temperature of the optical waveguide by heating the heater of the phase shifter.

In recent years, optical modulators that modulate light in response to electric signals from outside have become one of the essential components in configuring optical fiber communication systems and optical information processing systems. In particular, a Mach-Zehnder interferometer type optical modulator that uses a waveguide-type optical interferometer described in Patent Document 1 enables high-speed modulation of 40 Gbps or higher. Since Mach-Zehnder interferometer type optical modulators have a low wavelength chirp under high-speed modulation, Mach-Zehnder interferometer type optical modulators can be used for future ultra high-speed, high-capacity optical communication systems. In particular, Mach-Zehnder interferometer type optical modulators composed of semiconductors are small in size, have low power consumption, and can be monolithically integrated with other semiconductor optical devices such as a laser diode through to achieve wider versatility.

One example of a known semiconductor Mach-Zehnder interferometer type optical modulator is an npin-structured modulator. An npin structured Mach-Zehnder interferometer type optical modulator includes a waveguide structure formed by sandwiching a core layer (i layer) composed of an undoped semiconductor with two cladding layers composed of an n-type semiconductor and then inserting a thin p-type semiconductor layer between the core layer and one of the cladding layers. FIGS. 13, 14A, and 14B are diagrams showing one example of an npin-structured Mach-Zehnder interferometer type optical modulator.

As shown in FIG. 13, a Mach-Zehnder interferometer type optical modulator 100 includes two optical waveguides 110 and 120, an input optical coupler 130, an output optical coupler 140, and upper electrodes 150 and 160. These components are formed on an n-type semiconductor substrate 101 (refer to FIGS. 14A and 14B). The optical waveguide 110 includes a waveguiding section 211, a phase shifting section 212, and a waveguiding section 213, aligned in that order in the waveguiding direction. The optical waveguide 120 includes a waveguiding section 121, a phase shifting section 122, and a waveguiding section 123 also aligned in that order in the waveguiding direction. The phase shifting sections 212 and 122 are sections in which the upper electrodes 150 and 160 are respectively disposed and to which a signal voltage is applied. Each of the optical waveguides 110 and 120 has one end connected to the input optical coupler 130 and the other end connected to the output optical coupler 140.

Referring now to FIGS. 14A and 14B, the Mach-Zehnder interferometer type optical modulator 100 includes an n-type lower cladding layer 103, core layers 104a and 104b, p-type semiconductor layers 105a and 105b, and n-type upper cladding layers 106a and 106b. The core layer 104a is interposed between the n-type lower cladding layer 103 and the n-type upper cladding layer 106a. The p-type semiconductor layer 105a is interposed between the core layer 104a and the n-type upper cladding layer 106a. The core layer 104b is interposed between the n-type lower cladding layer 103 and the n-type upper cladding layer 106b. The p-type semiconductor layer 105b is interposed between the core layer 104b and the n-type upper cladding layer 106b. The upper electrode 150 is disposed on the n-type upper cladding layer 106a. The upper electrode 160 is disposed on the n-type upper cladding layer 106b. A lower electrode 170 is formed on the back of the n-type semiconductor substrate 101.

A part of the n-type lower cladding layer 103, the core layer 104a, the p-type semiconductor layer 105a, and the n-type upper cladding layer 106a form a mesa structure 107a. The mesa structure 107a constitutes the optical waveguide 110. Similarly, another part of the n-type lower cladding layer 103, the core layer 104b, the p-type semiconductor layer 105b, and the n-type upper cladding layer 106b form another mesa structure 107b. The mesa structure 107b constitutes the optical waveguide 120. Side surfaces of the mesa structures 107a and 107b are buried by, for example, a polyimide resin 108.

According to the Mach-Zehnder interferometer type optical modulator 100, the refractive indices of the core layers 104a and 104b can be changed by applying a reverse bias voltage between the lower electrode 170 and the upper electrodes 150 and 160. As a result, the phase of the light guided in the core layers 104a and 104b can be shifted.

SUMMARY OF THE INVENTION

According to this npin-structured Mach-Zehnder interferometer type optical modulator 100, the n-type upper cladding layers 106a and 106b are continuously formed over the optical waveguides 110 and 120, the input optical coupler 130, and the output optical coupler 140. It has been found that current leakage occurs between the optical waveguides for the Mach-Zehnder interferometer type optical modulator having an n-type upper cladding layer formed over the optical waveguides 110 and 120. It has also been found that this is due to a relatively small electric resistance of the n-type semiconductor layer constituting the n-type upper cladding layer. For example, when a reverse bias voltage is applied between the upper electrode 150 and the lower electrode 170, a leakage current flows from the n-type upper cladding layer 106a of the phase shifting section 212 of the optical waveguide 110 to the other optical waveguide 120 via the n-type upper cladding layer 106a of the waveguiding section 211 and the n-type upper cladding layer of the input optical coupler 130. When the leakage current flows, electrical cross-talk occurs between the optical waveguides. The cross-talk degrades the characteristics of the Mach-Zehnder interferometer type optical modulator 100.

An aspect of the present invention provides a semiconductor optical device that includes a first optical waveguide, a second optical waveguide, an input optical coupler, and an output optical coupler. The first optical waveguide includes a first section, a second section, and a third section aligned in that order in a waveguiding direction. The second optical waveguide includes a fourth section, a fifth section, and a sixth section aligned in that order in the waveguiding direction. The input optical coupler is connected to one end of each of the first optical waveguide and the second optical waveguide. The output optical coupler is connected to the other end of each of the first optical waveguide and the second optical waveguide. The first, second, and third sections of the first optical waveguide, the fourth, fifth, and sixth sections of the second optical waveguide, the input optical coupler, and the output optical coupler each include a first cladding layer composed of an n-type semiconductor and a core layer disposed on the first cladding layer. The core layer is composed of an undoped semiconductor. The second section of the first optical waveguide and the fifth section of the second optical waveguide each include an intermediate semiconductor layer disposed on the core layer and a second cladding layer disposed on the intermediate semiconductor layer. The second cladding layer is composed of an n-type semiconductor. The first and third sections of the first optical waveguide, the fourth and sixth sections of the second optical waveguide, the input optical coupler, and the output optical coupler each further include a third cladding layer on the core layer. At least one of the third cladding layers included in the first and third sections of the first optical waveguide, the fourth and sixth sections of the second optical waveguide, the input optical coupler, and the output optical coupler includes a first cladding section disposed on the core layer and a second cladding section disposed on the first cladding section. The second cladding section is composed of a semi-insulating semiconductor.

In this semiconductor optical device, at least one of the third cladding layers included in the first and third sections of the first optical waveguide, the fourth and sixth sections of the second optical waveguide, the input optical coupler, and the output optical coupler includes a section composed of a semi-insulating semiconductor. A third cladding layer including a section composed of a semi-insulating semiconductor exhibits a relatively high electric resistance. Accordingly, the leakage current that flows from one optical waveguide to the other when a reverse bias voltage is applied to the second section of the first optical waveguide and the fifth section of the second optical waveguide is reduced. As a result, electrical cross-talk can be suppressed and degradation of device characteristics can be suppressed.

The input optical coupler and the output optical coupler of the semiconductor optical device may be multimode interference (MMI) couplers or Y-branch optical couplers. When the input optical coupler and the output optical coupler are MMI couplers or Y-branch optical couplers, the third cladding layers of these optical couplers are physically connected to the third cladding layers of the first and third sections of the first optical waveguide and the fourth and sixth sections of the second optical waveguide. When at least one of the third cladding layers of the first and third sections of the first optical waveguide, the fourth and sixth sections of the second optical waveguide, the input coupler, and the output coupler is configured to include a section composed of a semi-insulating semiconductor, the leakage current flowing from one optical waveguide to the other can be reduced even in the case where the MMI couplers or Y-branch optical couplers are used as the input optical coupler or the output optical coupler.

The intermediate semiconductor layers of the second section of the first optical waveguide and the fifth section of the second optical waveguide may be composed of a p-type semiconductor or a semi-insulating (SI) semiconductor. In this semiconductor optical device, the second section of the first optical waveguide and the fifth section of the second optical waveguide have an n-p-i-n structure or n-SI-i-n structure including an intermediate semiconductor layer composed of a p-type semiconductor or a semi-insulating semiconductor. According to this semiconductor optical device, at least one of the third cladding layers included in the first and third sections of the first optical waveguide, the fourth and sixth sections of the second optical waveguide, the input optical coupler, and the output optical coupler includes a section composed of a semi-insulating semiconductor. Therefore, the leakage current flowing from one optical waveguide to the other can be reduced even if the second section of the first optical waveguide and the fifth section of the second optical waveguide have an n-p-i-n structure or n-SI-i-n structure.

The third cladding layers of the first and third sections of the first optical waveguide, the fourth and sixth sections of the second optical waveguide, the input optical coupler, and the output optical coupler of this semiconductor optical device may each include the first cladding section and the second cladding section, and the first cladding section may be composed of a semi-insulating semiconductor. In such a case, since each of the third cladding layers of the first and third sections of the first optical waveguide, the fourth and sixth sections of the second optical waveguide, the input optical coupler, and the output optical coupler includes a section composed of a semi-insulating semiconductor, the electric resistance of the third cladding layer can be further increased. As a result, the leakage current can be reduced.

According to this semiconductor optical device, the third cladding layers of the first and third sections of the first optical waveguide, the fourth and sixth sections of the second optical waveguide, the input optical coupler, and the output optical coupler may each include the first cladding section and the second cladding section, and the first cladding section may be composed of an undoped semiconductor or an n-type semiconductor. Since the second cladding section of each of the third cladding layers of the first and third sections of the first optical waveguide, the fourth and sixth sections of the second optical waveguide, the input optical coupler, and the output optical coupler is composed of a semi-insulating semiconductor, the leakage current can be reduced. Since the first cladding section in which the guided light is intensely distributed is composed of an undoped semiconductor or n-type semiconductor having a relatively small optical absorption, the optical loss can be reduced.

Some of the third cladding layers of the first and third sections of the first optical waveguide, the fourth and sixth sections of the second optical waveguide, the input optical coupler, and the output optical coupler of the semiconductor optical device may each include a plurality of semiconductor sections aligned in the waveguiding direction. Some of the semiconductor sections may be composed of a semi-insulating semiconductor. The other semiconductor sections may be composed of an undoped semiconductor or an n-type semiconductor. The other third cladding layers of the first and third sections of the first optical waveguide, the fourth and sixth sections of the second optical waveguide, the input optical coupler, and the output optical coupler may be composed of an undoped semiconductor or an n-type semiconductor. According to this configuration, some sections of some of the third cladding layers of the first and third sections of the first optical waveguide, the fourth and sixth sections of the second optical waveguide, the input optical coupler, and the output optical coupler are composed of a semi-insulating semiconductor while the remaining sections are composed of an undoped semiconductor or n-type semiconductor. As a result, the leakage current can be reduced and the optical loss of guided light can be further reduced.

Some of the third cladding layers of the first and third sections of the first optical waveguide, the fourth and sixth sections of the second optical waveguide, the input optical coupler, and the output optical coupler of the semiconductor optical device may each include a plurality of semiconductor sections aligned in the waveguiding direction. Some of the semiconductor sections may each include the first cladding section and the second cladding section and the first cladding section may be composed of an undoped semiconductor or an n-type semiconductor. The other semiconductor sections may be composed of an undoped semiconductor or an n-type semiconductor. The other third cladding layers of the first and third sections of the first optical waveguide, the fourth and sixth sections of the second optical waveguide, the input optical coupler, and the output optical coupler may be composed of an undoped semiconductor or an n-type semiconductor. According to this configuration, only the second cladding sections of some sections of the some of the third cladding layers of the first and third sections of the first optical waveguide, the fourth and sixth sections of the second optical waveguide, the input optical coupler, and the output optical coupler are composed of a semi-insulating semiconductor while the first cladding sections in which the guided light is intensely distributed are composed of an undoped semiconductor or n-type semiconductor having a relatively small optical absorption. Thus, the leakage current can be reduced and the optical loss of the guided light can be reduced.

The first and second optical waveguides of the semiconductor optical device may each be configured to have a mesa structure including the core layer. The side surfaces of the mesa structure may be buried by a resin layer. The resin layer may be composed of a polyimide resin or a BCB resin. The semiconductor optical device may further include a first electrode disposed on the second section of the first optical waveguide and a second electrode disposed on the fifth section of the second optical waveguide.

According to the semiconductor optical device, the semi-insulating semiconductor may be a group III-V compound semiconductor doped with one transition metal element selected from Fe, Ti, Cr, and Co, and the group III-V compound semiconductor may be one of InP, GaInAsP, AlGaInAs, and AlInAs. As a result, sections containing a semi-insulating semiconductor can be easily formed by a crystal growth method.

DESCRIPTION OF THE PREFERRED EMBODIMENTS

Figure 1:
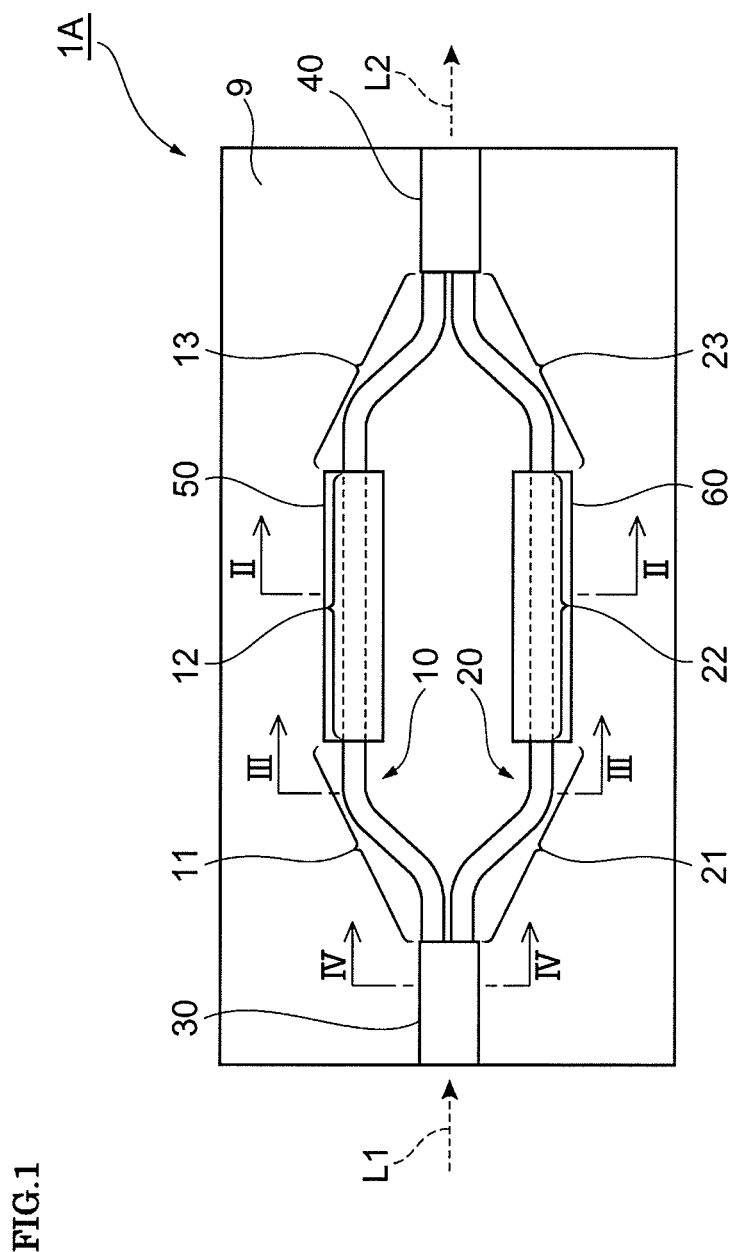
FIG. 1 is a plan view of a Mach-Zehnder interferometer type optical modulator 1A which is a first embodiment of the semiconductor optical device of the present invention.

Embodiments of the semiconductor optical device of the present invention will now be described in detail with reference to the attached drawings. In the description of the drawings, the same components are given the same reference numerals and the description therefor is omitted to avoid redundancy.

First Embodiment

Figure 2:
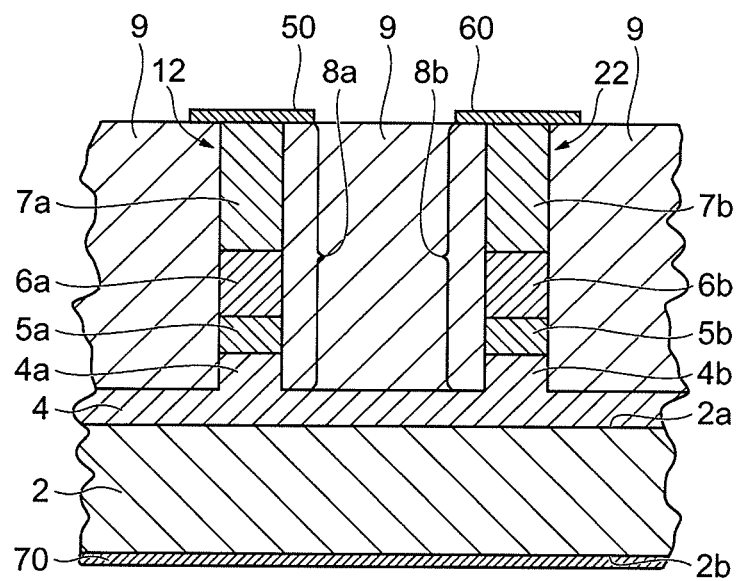
FIG. 2 is a cross-sectional view of the Mach-Zehnder interferometer type optical modulator 1A shown in FIG. 1 taken along line II-II.

A Mach-Zehnder interferometer type optical modulator is described below as an embodiment of the semiconductor optical device according to the present invention. Referring to FIG. 1, a Mach-Zehnder interferometer type optical modulator 1A of this embodiment includes two optical waveguides 10 and 20, an input optical coupler 30, an output optical coupler 40, and two upper electrodes 50 and 60. The optical waveguides 10 and 20, the input optical coupler 30, and the output optical coupler 40 are disposed on a main surface 2a of an n-type semiconductor substrate 2 as shown in FIG. 2. An n-type InP substrate can be used as the n-type semiconductor substrate 2, for example. The Mach-Zehnder interferometer type optical modulator 1A further includes a lower electrode 70 disposed on a rear surface 2b of the n-type semiconductor substrate 2 (refer to FIGS. 2 to 4).

The optical waveguide 10 is a first optical waveguide according to this embodiment and the optical waveguide 20 is a second optical waveguide according to this embodiment. The optical waveguides 10 and 20 extend between the input optical coupler 30 and the output optical coupler 40 and each have one end connected to the input optical coupler 30 and the other end connected to the output optical coupler 40. The optical waveguides 10 and 20 are provided in parallel with each other in an extending direction. The optical waveguides 10 and 20 may have the same optical length. However, the optical waveguides 10 and 20 may have different optical lengths.

The optical waveguide 10 includes a waveguiding section 11, a phase shifting section 12, and a waveguiding section 13. The waveguiding section 11, the phase shifting section 12, and the waveguiding section 13 are aligned in that order in the waveguiding direction (the direction in which the optical waveguide 10 extends). The waveguiding section 11 is a first section according to this embodiment. The phase shifting section 12 is a second section according to this embodiment. The waveguiding section 13 is a third section according to this embodiment.

The optical waveguide 20 includes a waveguiding section 21, a phase shifting section 22, and a waveguiding section 23. The waveguiding section 21, the phase shifting section 22, and the waveguiding section 23 are aligned in that order in the waveguiding direction (the direction in which the optical waveguide 20 extends). The waveguiding section 21 is a fourth section according to this embodiment. The phase shifting section 22 is a fifth section according to this embodiment. The waveguiding section 23 is a sixth section according to this embodiment.

The input optical coupler 30 branches incoming light L1 coming into the Mach-Zehnder interferometer type optical modulator 1A from outside to the optical waveguide 10 and the optical waveguide 20. The output optical coupler 40 combines the light that has propagated through the optical waveguides 10 and 20. The input optical coupler 30 and the output optical coupler 40 are each constituted by, for example, a multimode interference (MMI) coupler.

The upper electrode 50 is disposed on the phase shifting section 12, and the upper electrode 60 is disposed on the phase shifting section 22.

The phase shifting sections 12 and 22 will now be described with reference to FIG. 2. The phase shifting section 12 includes a lower cladding layer 4a, a core layer 5a, an intermediate semiconductor layer 6a, and an upper cladding layer 7a. The lower cladding layer 4a, the core layer 5a, the intermediate semiconductor layer 6a, and the upper cladding layer 7a form a mesa structure 8a. The phase shifting section 22 includes a lower cladding layer 4b, a core layer 5b, an intermediate semiconductor layer 6b, and an upper cladding layer 7b. The lower cladding layer 4b, the core layer 5b, the intermediate semiconductor layer 6b, and the upper cladding layer 7b form a mesa structure 8b. Both side surfaces of the mesa structures 8a and 8b are buried in a resin layer 9 composed of benzocyclobutene (BCB) resin or a polyimide resin.

A lower cladding layer 4 is disposed on the main surface 2a of the n-type semiconductor substrate 2. The lower cladding layers 4a and 4b are integrated with the lower cladding layer 4. The lower cladding layers 4, 4a, and 4b are a first cladding layer of this embodiment. The lower cladding layers 4, 4a, and 4b are composed of an n-type semiconductor. The lower cladding layers 4, 4a, and 4b may be composed of a semiconductor such as InP, GaInAsP, AlGaInAs, or AlInAs. The core layer 5a is disposed on the lower cladding layer 4a and the core layer 5b is disposed on the lower cladding layer 4b. The core layers 5a and 5b are composed of an undoped semiconductor. Here, the "undoped semiconductor" refers to a semiconductor to which an impurity element is not intentionally added. For example, an undoped semiconductor can be formed by not adding an impurity element during formation of the semiconductor layer by crystal growth. The impurity concentration in the undoped semiconductor may be, for example, not more than $1 \times 10^{16}$ cm$^{-3}$. The core layers 5a and 5b may be composed of a semiconductor such as GaInAsP, AlGaInAs, AlInAs, or GaInAs. The core layers 5a and 5b may each be a single layer (bulk layer) or may have a quantum well structure constituted by alternately stacked well layers and barrier layers.

The intermediate semiconductor layer 6a is disposed on the core layer 5a, and the intermediate semiconductor layer 6b is disposed on the core layer 5b. The intermediate semiconductor layers 6a and 6b are composed of a p-type semiconductor. The intermediate semiconductor layers 6a and 6b may be composed of a semiconductor such as InP, GaInAsP, AlGaInAs, AlInAs, or GaInAs. The upper cladding layer 7a is disposed on the intermediate semiconductor layer 6a, and the upper cladding layer 7b is disposed on the intermediate semiconductor layer 6b. The upper cladding layers 7a and 7b are second cladding layers of this embodiment. The upper cladding layer 7a is in contact with the upper electrode 50, and the upper cladding layer 7b is in contact with the upper electrode 60. The upper cladding layers 7a and 7b are composed of an n-type semiconductor.

The waveguiding sections 11 and 21 will now be described with reference to FIG. 3. The waveguiding section 11 includes a lower cladding layer 14a, a core layer 15a, an intermediate semiconductor layer 16a, and an upper cladding layer 17a. The lower cladding layer 14a, the core layer 15a, the intermediate semiconductor layer 16a, and the upper cladding layer 17a form a mesa structure 18a. The waveguiding section 21 includes a lower cladding layer 14b, a core layer 15b, an intermediate semiconductor layer 16b, and an upper cladding layer 17b. The lower cladding layer 14b, the core layer 15b, the intermediate semiconductor layer 16b, and the upper cladding layer 17b form a mesa structure 18b. Both side surfaces of the mesa structures 18a and 18b are buried by the resin layer 9.

A lower cladding layer 14 is disposed on the main surface 2a of the n-type semiconductor substrate 2. The lower cladding layers 14a and 14b are integrated with the lower cladding layer 14. The lower cladding layers 14, 14a, and 14b are first cladding layers of this embodiment. The lower cladding layer 14a may be integrated with the lower cladding layer 4a. The lower cladding layer 14b may be integrated with the lower cladding layer 4b. The lower cladding layers 14, 14a, and 14b are composed of an n-type semiconductor. The core layer 15a is disposed on the lower cladding layer 14a. The core layer 15b is disposed on the lower cladding layer 14b. The core layer 15a may be integrated with the core layer 5a. The core layer 15b may be integrated with the core layer 5b. The core layers 15a and 15b are composed of an undoped semiconductor. The core layers 15a and 15b may each be a single layer (bulk layer) or may have a quantum well structure constituted by alternately stacked well layers and barrier layers.

The intermediate semiconductor layer 16a is disposed on the core layer 15a, and the intermediate semiconductor layer 16b is disposed on the core layer 15b. The intermediate semiconductor layer 16a may be integrated with the intermediate semiconductor layer 6a. The intermediate semiconductor layer 16b may be integrated with the intermediate semiconductor layer 6b. The intermediate semiconductor layers 16a and 16b are composed of a p-type semiconductor.

The upper cladding layer 17a is disposed on the intermediate semiconductor layer 16a on the core layer 15a in this embodiment. The upper cladding layer 17a is a third cladding layer of this embodiment. The upper cladding layer 17a includes a first cladding section 29a and a second cladding section 31a. The first cladding section 29a is disposed on the intermediate semiconductor layer 16a on the core layer 15a in this embodiment. The second cladding section 31a is disposed on the first cladding section 29a. The first cladding section 29a and the second cladding section 31a are composed of a semi-insulating semiconductor. In other words, the upper cladding layer 17a is composed of a semi-insulating semiconductor.

The semi-insulating semiconductor preferably has a high resistivity, e.g., $10^5$ Ωcm or higher. Such a semi-insulating semiconductor can be obtained by doping a transition metal element in a group III-V compound semiconductor. The transition metal element can form, for example, an electron deep trapping level in a band gap of the group III-V compound semiconductor. The semi-insulating semiconductor can be easily prepared by adding a transition metal element during crystal growth of the group III-V compound semiconductor. Alternatively, the semi-insulating semiconductor can be obtained by growing group III-V compound semiconductor crystals and then diffusing a transition metal element into the crystals through ion implantation or thermal diffusion. Preferred examples of the transition metal element include Fe, Ti, Cr, and Co. Examples of the group III-V compound semiconductor include InP, GaInAsP, AlGaInAs, and AlInAs.

The upper cladding layer 17b is disposed on the intermediate semiconductor layer 16b on the core layer 15b in this embodiment. The upper cladding layer 17b is a third cladding layer of this embodiment. The upper cladding layer 17b includes a first cladding section 29b and a second cladding section 31b. The first cladding section 29b is disposed on the intermediate semiconductor layer 16b on the core layer 15b in this embodiment. The second cladding section 31b is disposed on the first cladding section 29b. The first cladding section 29b and the second cladding section 31b are composed of a semi-insulating semiconductor. In other words, the upper cladding layer 17b is composed of a semi-insulating semiconductor. The waveguiding sections 13 and 23 have the same structures as the waveguiding sections 11 and 21, respectively.

The input optical coupler 30 will now be described with reference to FIG. 4. The input optical coupler 30 includes a lower cladding layer 24a, a core layer 25a, an intermediate semiconductor layer 26a, and an upper cladding layer 27a. The lower cladding layer 24a, the core layer 25a, the intermediate semiconductor layer 26a, and the upper cladding layer 27a form a mesa structure 28a. Both side surfaces of the mesa structure 28a are buried by the resin layer 9.

A lower cladding layer 24 is disposed on the main surface 2a of the n-type semiconductor substrate 2. The lower cladding layer 24a is integrated with the lower cladding layer 24. The lower cladding layers 24 and 24a are a first cladding layer of this embodiment. The lower cladding layer 24a may be integrated with the lower cladding layers 14a and 14b. The lower cladding layers 24 and 24a are composed of an n-type semiconductor. The core layer 25a is disposed on the lower cladding layer 24a. The core layer 25a may be integrated with the core layers 15a and 15b. The core layer 25a is composed of an undoped semiconductor. The core layer 25a may be a single layer (bulk layer) or may have a quantum well structure constituted by alternately stacked well layers and barrier layers.

The intermediate semiconductor layer 26a is disposed on the core layer 25a. The intermediate semiconductor layer 26a may be integrated with the intermediate semiconductor layers 16a and 16b. The intermediate semiconductor layer 26a is composed of a p-type semiconductor. The upper cladding layer 27a is formed on the intermediate semiconductor layer 26a on the core layer 25a in this embodiment. The upper cladding layer 27a is a third cladding layer of this embodiment. The upper cladding layer 27a may be integrated with the upper cladding layers 17a and 17b. The upper cladding layer 27a includes a first cladding section 39a and a second cladding section 41a. The first cladding section 39a is disposed on the intermediate semiconductor layer 26a on the core layer 25a in this embodiment. The second cladding section 41a is disposed on the first cladding section 39a. The first cladding section 39a and the second cladding section 41a are composed of a semi-insulating semiconductor. In other words, the upper cladding layer 27a is composed of a semi-insulating semiconductor. The output optical coupler 40 has the same structure as the input optical coupler 30.

Next, operation of the Mach-Zehnder interferometer type optical modulator 1A is described. Incoming light L1 (refer to FIG. 1) from outside the Mach-Zehnder interferometer type optical modulator 1A enters the core layer 25a of the input optical coupler 30. The incoming light L1 is branched to the waveguiding section 11 of the optical waveguide 10 and the waveguiding section 21 of the optical waveguide 20. Then a branched light beam reaches the output optical coupler 40 via the phase shifting section 12 and the waveguiding section 13 of the optical waveguide 10 and another light beam reaches the output optical coupler 40 via the phase shifting section 22 and the waveguiding section 23 of the optical waveguide 20. These beams are optically coupled in the core layer 25a of the output optical coupler 40 and form outgoing light L2 emitted to outside the Mach-Zehnder interferometer type optical modulator 1A.

A reverse bias voltage is applied between the lower electrode 70 and one or both of the upper electrodes 50 and 60 to generate an electrical field in one or both of the core layer 5a of the phase shifting section 12 of the optical waveguide 10 and the core layer 5b of the phase shifting section 22 of the optical waveguide 20. As a result, the refractive index of one or both of the core layer 5a and the core layer 5b can be changed due to the electro-optic effect or the quantum confined Stark effect (QCSE). Consequently, a phase difference is generated between the light propagating in the optical waveguide 10 and the light propagating in the optical waveguide 20. Interference caused by the phase difference between light occurs in the output optical coupler 40 and intensity-modulated outgoing light L2 is generated.

In the Mach-Zehnder interferometer type optical modulator 1A of this embodiment, the upper cladding layer 17a of the waveguiding section 11 of the optical waveguide 10, the upper cladding layer of the waveguiding section 13 of the optical waveguide 10, the upper cladding layer 17b of the waveguiding section 21 of the optical waveguide 20, the upper cladding layer of the waveguiding section 23 of the optical waveguide 20, the upper cladding layer 27a of the input optical coupler 30, and the upper cladding layer of the output optical coupler 40 are each composed of a semi-insulating semiconductor. Thus, these upper cladding layers have an electrical resistance greater than that of the n-type semiconductor layers. Accordingly, when a reverse bias voltage is applied to the phase shifting sections 12 and 22 by using the upper electrodes 50 and 60 and the lower electrode 70, the electric current is suppressed from flowing from one optical waveguide to another through the upper cladding layers (reduction of leakage current). Therefore, electrical cross-talk can be suppressed, and degradation of optical modulation characteristics (device characteristics) can be suppressed. In this embodiment, surfaces of the upper cladding layer 17a of the waveguiding section 11 of the optical waveguide 10, the upper cladding layer 7a of the waveguiding section 12, and the upper cladding layer of the waveguiding section 13 are flat. A groove or a similar structure for electrically isolating these sections is not needed at the borders between the sections of the upper cladding layers. Similarly, surfaces of the upper cladding layer 17b of the waveguiding section 21, the upper cladding layer 7b of the waveguiding section 22, and the upper cladding layer of the waveguiding section 23 of the optical waveguide 20 are flat. Thus, propagation loss and scattering that occur during propagation of light in the optical waveguides 10 and 20 can be suppressed.

Figure 5A:
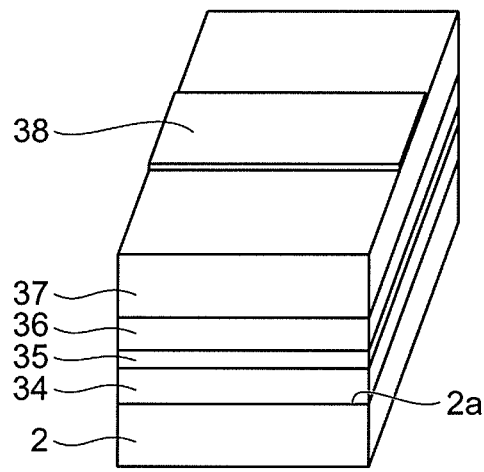
FIGS. 5A to 5C are diagrams showing major steps of manufacturing the Mach-Zehnder interferometer type optical modulator 1A shown in FIG. 1.

Next, an example of a method for making the Mach-Zehnder interferometer type optical modulator 1A is described with reference to FIGS. 5A to 5C, 6A to 6C, and 7. As shown in FIG. 5A, an n-type semiconductor substrate 2 composed of n-type InP is prepared. A lower cladding layer 34 composed of an n-type semiconductor, a core layer 35 composed of an undoped semiconductor, an intermediate semiconductor layer 36 composed of a p-type semiconductor, and an upper cladding layer 37 composed of an n-type semiconductor are sequentially grown on a main surface 2a of the semiconductor substrate 2. Each layer is grown by a crystal growth method such as metal-organic vapor phase epitaxy (MOVPE) or molecular beam epitaxy (MBE). An n-type dopant such as Si or Se is added in growing the layers composed of n-type semiconductors, and a p-type dopant such as Zn is added in growing the layers composed of p-type semiconductors. A mask 38 is formed on the upper cladding layer 37. The mask 38 is formed over the region where the upper cladding layers 7a and 7b of the phase shifting sections 12 and 22 are to be formed. A dielectric material such as $SiO_2$ or SiN is used as the material for the mask 38.

Figure 5B:
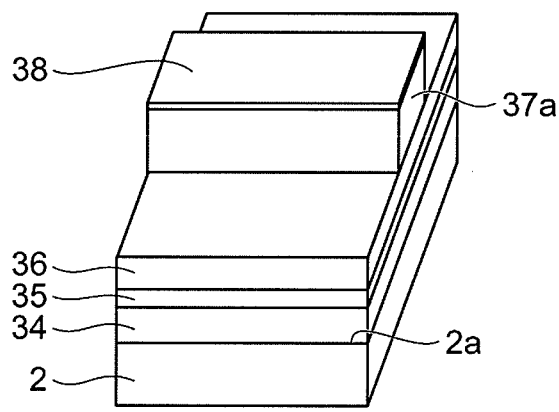

Next, as shown in FIG. 5B, the upper cladding layer 37 is etched using the mask 38. Portions of the upper cladding layer 37 not covered with the mask 38 are etched away and part of the surface of the intermediate semiconductor layer 36 is exposed. A new upper cladding layer 37a is formed as a result of etching the upper cladding layer 37. The method for etching is, for example, dry etching.

Figure 5C:
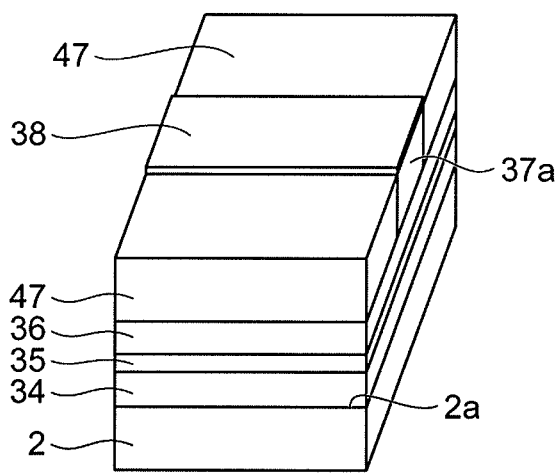

Next, as shown in FIG. 5C, an upper cladding layer 47 is formed on the surface of the intermediate semiconductor layer 36 by using the mask 38 as a selective growth mask. Growth is preferably conducted so that the level of the surface of the upper cladding layer 47 is substantially the same as the level of the surface of the upper cladding layer 37 composed of an n-type semiconductor. When the surface of the upper cladding layer 47 and the surface of the upper cladding layer 37 are at substantially the same level, a flat surface that has no level gap at the border between the upper cladding layers 47 and 37 can be obtained. The upper cladding layer 47 is composed of a semi-insulating semiconductor. An impurity such as Fe or Ti, is added during the growth of the upper cladding layer 47. These impurities can form a deep level in the band gap of a group III-V compound semiconductor.

Figure 6A:
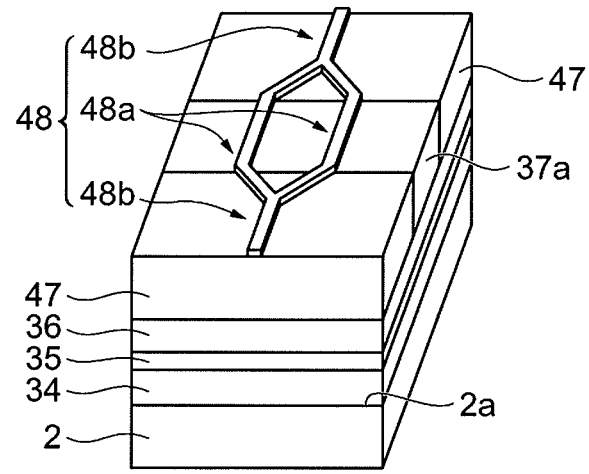
FIGS. 6A to 6C are diagrams showing major steps of manufacturing the Mach-Zehnder interferometer type optical modulator 1A shown in FIG. 1.

After the mask 38 is removed, as shown in FIG. 6A, a mask 48 is formed on the surfaces of the upper cladding layers 37a and 47. The mask 48 defines the outlines of the optical waveguides 10 and 20, the input optical coupler 30, and the output optical coupler 40. In the mask 48, a portion 48a that defines the phase shifting sections 12 and 22 is located on the surface of the upper cladding layer 37a, and portions 48b that define the waveguiding sections 11, 13, 21, and 23, the input optical coupler 30, and the output optical coupler 40 are located on the surface of the upper cladding layer 47. A dielectric material such as $SiO_2$ or SiN may be used as the material for the mask 48.

Figure 6B:
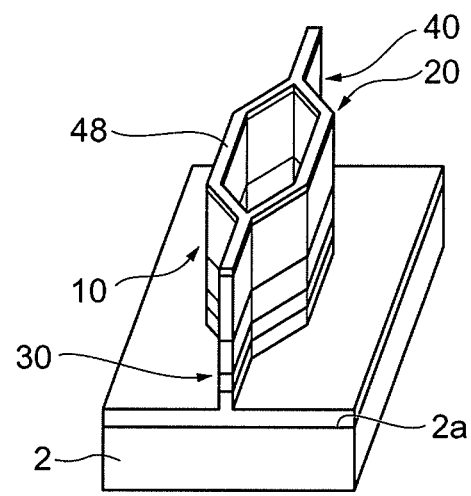

The upper cladding layers 37a and 47, the intermediate cladding layer 36, the core layer 35, and the lower cladding layer 34 are etched by using the mask 48. The etching depth is set so that part of the lower cladding layer 34 remains unetched. It is necessary to sufficiently confine the guided light in the mesa structure by increasing the difference in refractive index between the mesa structure formed by etching and the peripheral regions thereof. Accordingly, etching is continued at least until part of the lower cladding layer 34 is reached. In order to intensify optical confinement in the mesa structure, etching may be continued until part of the n-type semiconductor substrate 2 is reached. As a result of etching, as shown in FIG. 6B, the optical waveguides 10 and 20, the input optical coupler 30, and the output optical coupler 40 are formed.

Figure 6C:
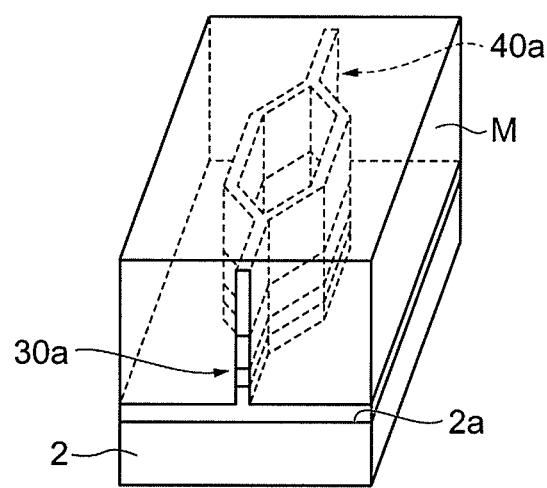

As shown in FIG. 6C, a resin layer M composed of BCB, polyimide, or the like, is formed on the main surface 2a of the n-type semiconductor substrate 2 to cover the entire top surfaces of the optical waveguides 10 and 20, surfaces of the input optical coupler 30 other than an input end surface 30a, and surfaces of the output optical coupler 40 other than an output end surface 40a.

Figure 7:
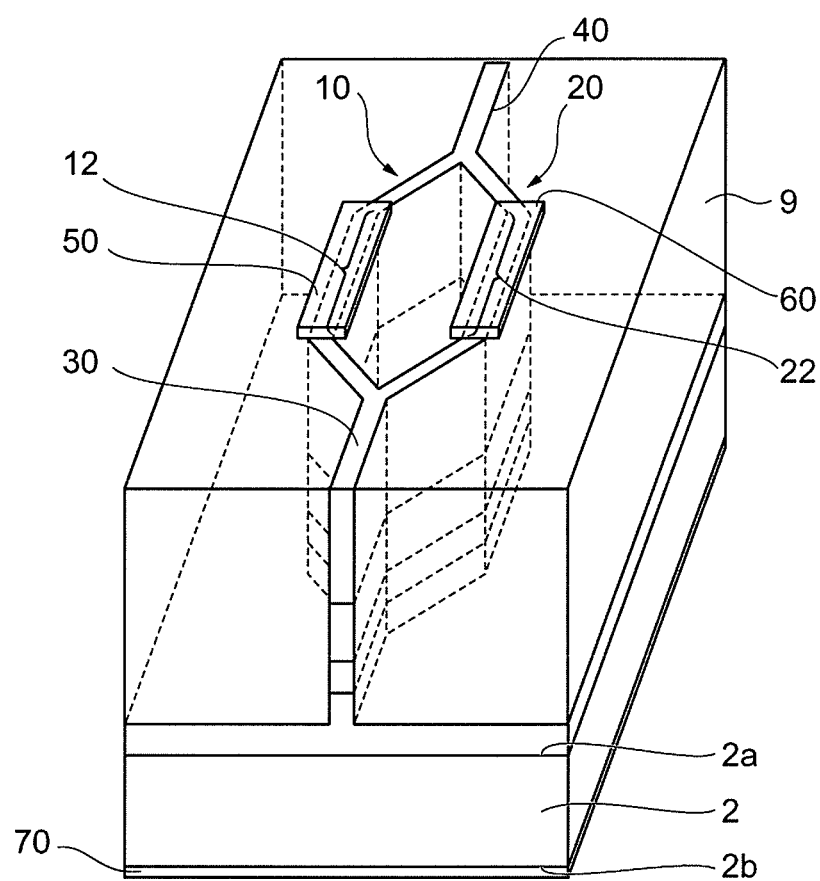
FIG. 7 is a diagram showing a major step of manufacturing the Mach-Zehnder interferometer type optical modulator 1A shown in FIG. 1.

Then the resin layer M is partly removed by, for example, dry etching to expose top surfaces of the upper cladding layers of the optical waveguides 10 and 20, the input optical coupler 30, and the output optical coupler 40. As a result, the resin layer 9 is formed. Then as shown in FIG. 7, the upper electrodes 50 and 60 are respectively formed on the phase shifting sections 12 and 22. The rear surface of the n-type semiconductor substrate 2 is polished to reduce the thickness to a certain level (e.g., about 100 µm) and the lower electrode 70 is formed on the rear surface 2b of the polished semiconductor substrate 2. The upper electrodes 50 and 60 and the lower electrode 70 can be formed by, for example, an evaporation method or a sputtering method. As a result, the Mach-Zehnder interferometer type optical modulator 1A is made.

Second Embodiment

Figure 8:
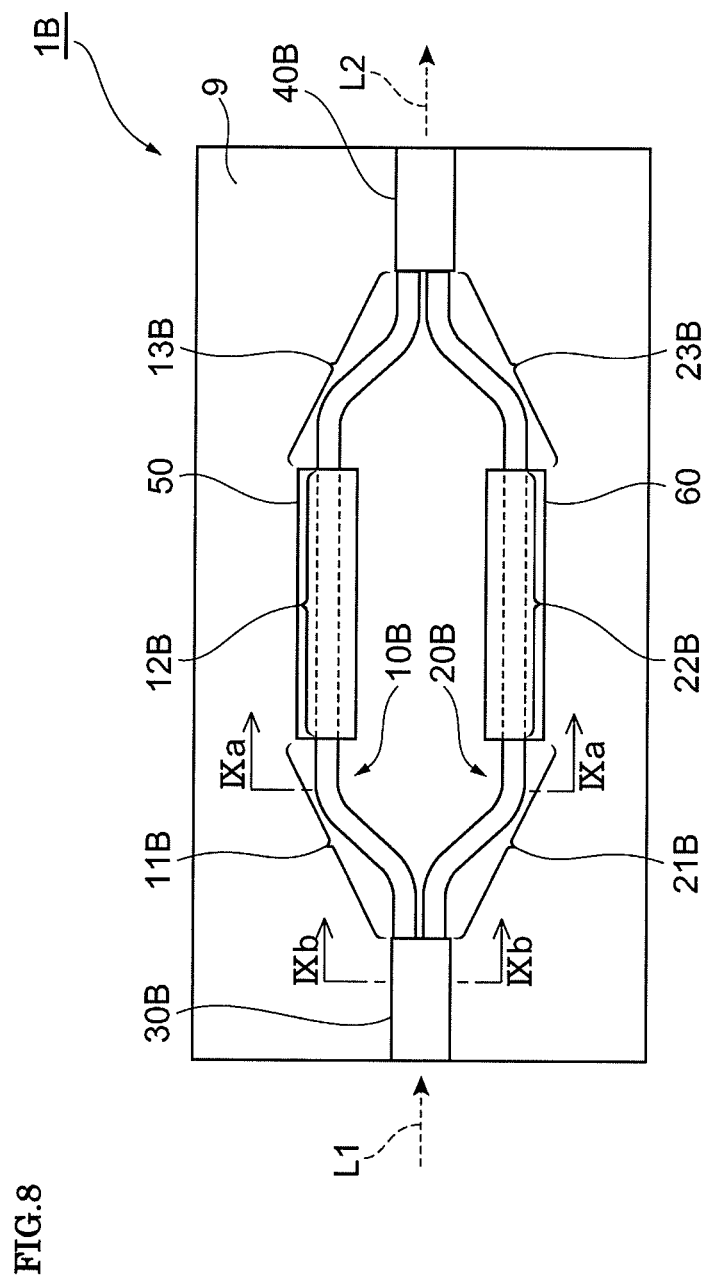
FIG. 8 is a plan view showing a structure of a Mach-Zehnder interferometer type optical modulator 1B which is a second embodiment of the semiconductor optical device of the present invention.
Figure 9A:
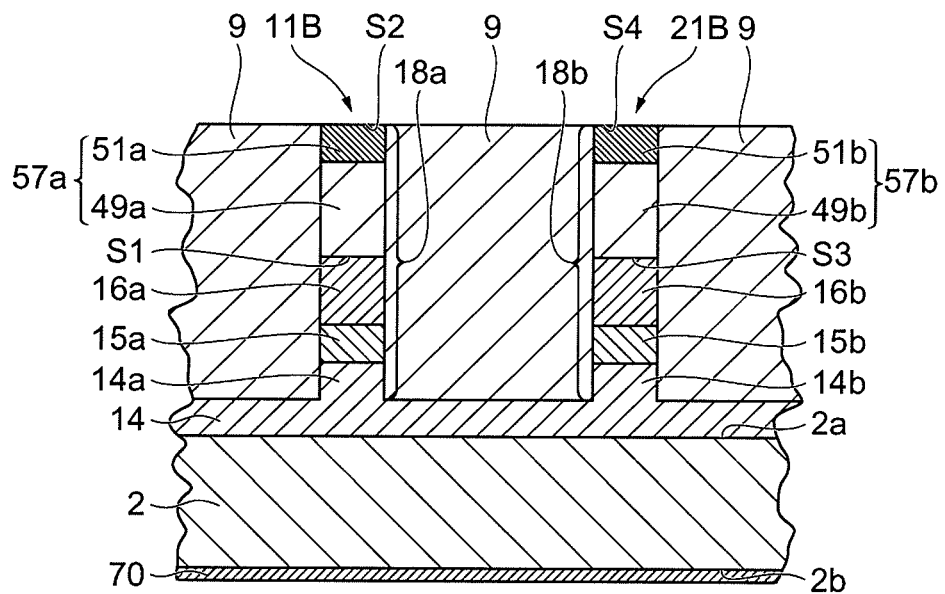
FIG. 9A is a cross-sectional view of the Mach-Zehnder interferometer type optical modulator 1B shown in FIG. 8 taken along line IXa-IXa and FIG. 9B is a cross-sectional view of the Mach-Zehnder interferometer type optical modulator 1B shown in FIG. 8 taken along line IXb-IXb.
Figure 9B:
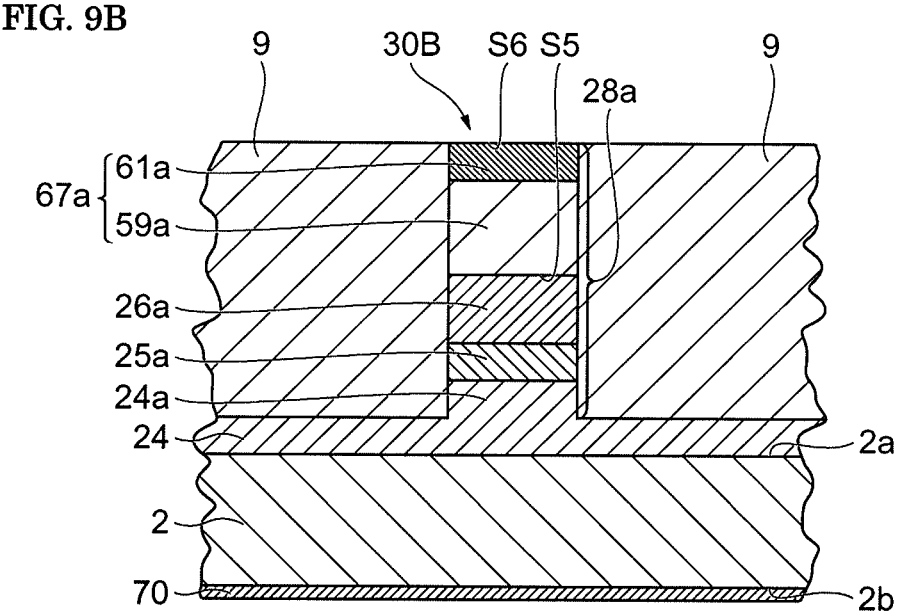

Another Mach-Zehnder interferometer type optical modulator is described below as a second embodiment of the semiconductor optical device according to the present invention. Referring to FIG. 8, a Mach-Zehnder interferometer type optical modulator 1B of this embodiment includes two optical waveguides 10B and 20B, an input optical coupler 30B, an output optical coupler 40B, and two upper electrodes 50 and 60. The optical waveguides 10B and 20B, the input optical coupler 30B, and the output optical coupler 40B are formed on a main surface 2a of an n-type semiconductor substrate 2 as shown in FIGS. 9A and 9B. The Mach-Zehnder interferometer type optical modulator 1B further includes a lower electrode 70 formed on a rear surface 2b of the n-type semiconductor substrate 2 (refer to FIGS. 9A and 9B).

The optical waveguide 10B is a first optical waveguide according to this embodiment and the optical waveguide 20B is a second optical waveguide according to this embodiment. The optical waveguides 10B and 20B extend between the input optical coupler 30B and the output optical coupler 40B and each have one end connected to the input optical coupler 30B and the other end connected to the output optical coupler 40B. The optical waveguides 10B and 20B are provided in parallel with each other in an extending direction.

The optical waveguide 10B includes a waveguiding section 11B, a phase shifting section 12B, and a waveguiding section 13B. The waveguiding section 11B, the phase shifting section 12B, and the waveguiding section 13B are aligned in that order in the waveguiding direction (the direction in which the optical waveguide 10B extends). The waveguiding section 11B is a first section according to this embodiment. The phase shifting section 12B is a second section according to this embodiment. The waveguiding section 13B is a third section according to this embodiment.

The optical waveguide 20B includes a waveguiding section 21B, a phase shifting section 22B, and a waveguiding section 23B. The waveguiding section 21B, the phase shifting section 22B, and the waveguiding section 23B are aligned in that order in the waveguiding direction (the direction in which the optical waveguide 20B extends). The waveguiding section 21B is a fourth section according to this embodiment. The phase shifting section 22B is a fifth section according to this embodiment. The waveguiding section 23B is a sixth section according to this embodiment.

The input optical coupler 30B branches incoming light L1 coming into the Mach-Zehnder interferometer type optical modulator 1B from outside to the optical waveguide 10B and the optical waveguide 20B. The output optical coupler 40B combines the light that has propagated through the optical waveguides 10B and 20B. The input optical coupler 30B and the output optical coupler 40B are each constituted by, for example, a MMI coupler.

The upper electrode 50 is formed on the phase shifting section 12B, and the upper electrode 60 is formed on the phase shifting section 22B.

The waveguiding sections 11b and 21B and the input optical coupler 30B will now be described with reference to FIGS. 9A and 9B. Note that the phase shifting section 12B has the same structure as the phase shifting section 12 of the optical waveguide 10 shown in FIG. 2, and the phase shifting section 22B has the same structure as the phase shifting section 22 of the optical waveguide 20 shown in FIG. 2.

Figure 3:
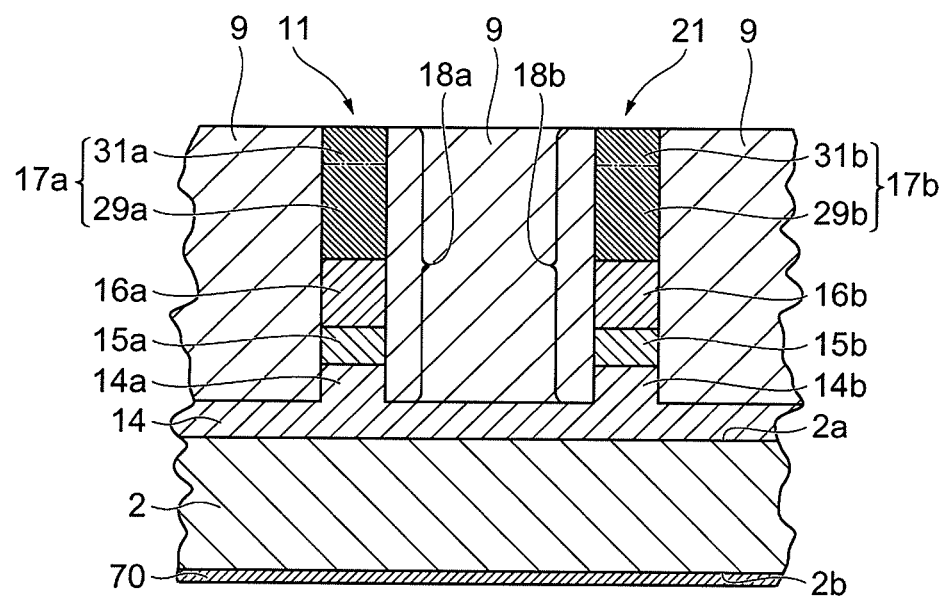
FIG. 3 is a cross-sectional view of the Mach-Zehnder interferometer type optical modulator 1A shown in FIG. 1 taken along line III-III.

Referring to FIG. 9A, the waveguiding section 11B differs from the waveguiding section 11 of the optical waveguide 10 shown in FIG. 3 in that an upper cladding layer 57a is provided instead of the upper cladding layer 17a. The waveguiding section 21B differs from the waveguiding section 21 of the optical waveguide 20 shown in FIG. 3 in that an upper cladding layer 57b is provided instead of the upper cladding layer 17b. The upper cladding layers 57a and 57b are third cladding layers of this embodiment.

The upper cladding layer 57a includes a first cladding section 49a and a second cladding section 51a. The first cladding section 49a is disposed on the intermediate semiconductor layer 16a on the core layer 15a in this embodiment. The second cladding section 51a is disposed on the first cladding section 49a. The first cladding section 49a is composed of an undoped semiconductor and the second cladding section 51a is composed of a semi-insulating semiconductor. In other words, an undoped semiconductor constitutes a portion of the upper cladding layer 57a, the portion being located on the core layer 15a-side and including an interface S1 with the intermediate semiconductor layer 16a. And a semi-insulating semiconductor constitutes another portion of the upper cladding layer 57a, the another portion including a surface S2 opposite the interface S1 of the upper cladding layer 57a.

The upper cladding layer 57b includes a first cladding section 49b and a second cladding section 51b. The first cladding section 49b is disposed on the intermediate semiconductor layer 16b on the core layer 15b in this embodiment. The second cladding section 51b is disposed on the first cladding section 49b. The first cladding section 49b is composed of an undoped semiconductor and the second cladding section 51b is composed of a semi-insulating semiconductor. In other words, an undoped semiconductor constitutes a portion of the upper cladding layer 57b, the portion being located on the core layer 15b-side and including an interface S3 with the intermediate semiconductor layer 16b. And a semi-insulating semiconductor constitutes another portion of the upper cladding layer 57b, the another portion including a surface S4 opposite the interface S3 of the upper cladding layer 57b. The waveguiding sections 13B and 23B have the same structures as the waveguiding sections 11B and 21B, respectively.

Figure 4:
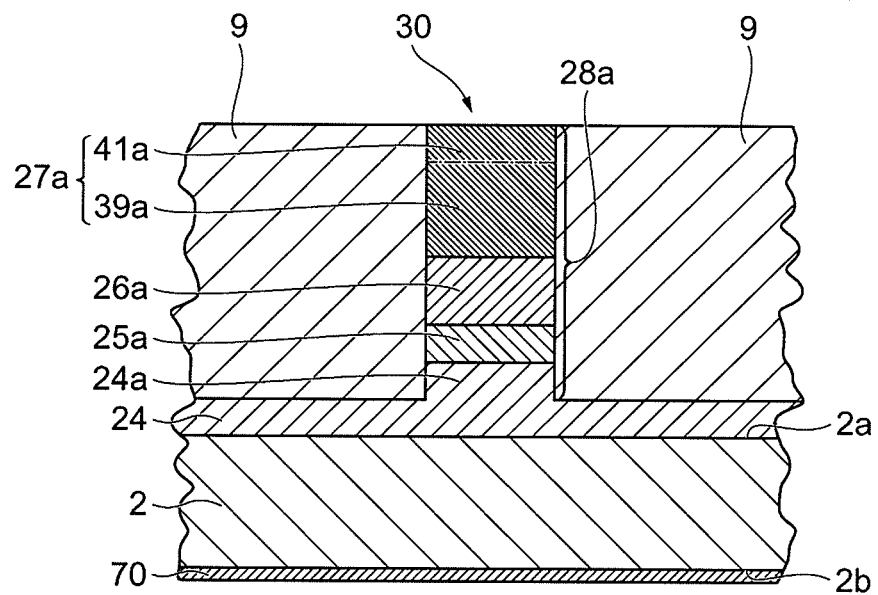
FIG. 4 is a cross-sectional view of the Mach-Zehnder interferometer type optical modulator 1A shown in FIG. 1 taken along line IV-IV.

Referring to FIG. 9B, the input optical coupler 30B differs from the input optical coupler 30 shown in FIG. 4 in that an upper cladding layer 67a is provided instead of the upper cladding layer 27a. The upper cladding layer 67a is a third cladding layer of this embodiment. The upper cladding layer 67a includes a first cladding section 59a and a second cladding section 61a. The first cladding section 59a is disposed on the intermediate semiconductor layer 26a on the core layer 25a in this embodiment. The second cladding section 61a is disposed on the first cladding section 59a. The first cladding section 59a is composed of an undoped semiconductor and the second cladding section 61a is composed of a semi-insulating semiconductor. In other words, an undoped semiconductor constitutes a portion of the upper cladding layer 67a, the portion being located on the core layer 25a-side and including an interface S5 with the intermediate semiconductor layer 26a. And a semi-insulating semiconductor constitutes another portion of the upper cladding layer 67a, the another portion including a surface S6 opposite the interface S5 of the upper cladding layer 67a. The first cladding sections 59a, 49a, and 49b may be integrated with each other. The second cladding sections 61a, 51a, and 51b may be integrated with each other. The output optical coupler 40B has the same structure as the input optical coupler 30B.

Operation of the Mach-Zehnder interferometer type optical modulator 1B is the same as the Mach-Zehnder interferometer type optical modulator 1A.

In the Mach-Zehnder interferometer type optical modulator 1B of this embodiment, the second cladding section 51a of the upper cladding layer 57a of the waveguiding section 11B, the second cladding section of the upper cladding layer of the waveguiding section 13b, the second cladding section 51b of the upper cladding layer 57b of the waveguiding section 21B, the second cladding section of the upper cladding layer of the waveguiding section 23B, the second cladding section 61a of the upper cladding layer 67a of the input optical coupler 30B, and the second cladding section of the upper cladding layer of the output optical coupler 40B are each composed of a semi-insulating semiconductor. Thus, the leakage current between the optical waveguides 10B and 20B can be reduced. In the Mach-Zehnder interferometer type optical modulator 1B of this embodiment, the first cladding section 49a of the upper cladding layer 57a of the waveguiding section 11B, the first cladding section of the upper cladding layer of the waveguiding section 13b, the first cladding section 49b of the upper cladding layer 57b of the waveguiding section 21B, the first cladding section of the upper cladding layer of the waveguiding section 23B, the first cladding section 59a of the upper cladding layer 67a of the input optical coupler 30B, and the first cladding section of the upper cladding layer of the output optical coupler 40B are each composed of an undoped semiconductor. Optical absorption of the undoped semiconductor is smaller than that of the semi-insulating semiconductor doped with a transition metal such as Fe or Ti. Thus, according to the Mach-Zehnder interferometer type optical modulator 1B of this embodiment, absorption loss of the light propagating in the optical waveguides 10B and 20B can be reduced compared to the structure in that first and second cladding sections of the upper cladding layers of the waveguiding sections 11B, 13B, 21B, and 23B, the input optical coupler 30B, and the output optical coupler 40B are all composed of a semi-insulating semiconductor.

In this embodiment, the sections composed of an undoped semiconductor may be composed of an n-type semiconductor. As with the undoped semiconductor, an n-type semiconductor also has a small optical absorption compared to the semi-insulating semiconductor. Thus, absorption loss of the light propagating in the optical waveguides 10B and 20B can be reduced compared to the structure in which first and second cladding sections of the upper cladding layers of the waveguiding sections 11B, 13B, 21B, and 23B, the input optical coupler 30B, and the output optical coupler 40B are all composed of a semi-insulating semiconductor.

Third Embodiment

Figure 10:
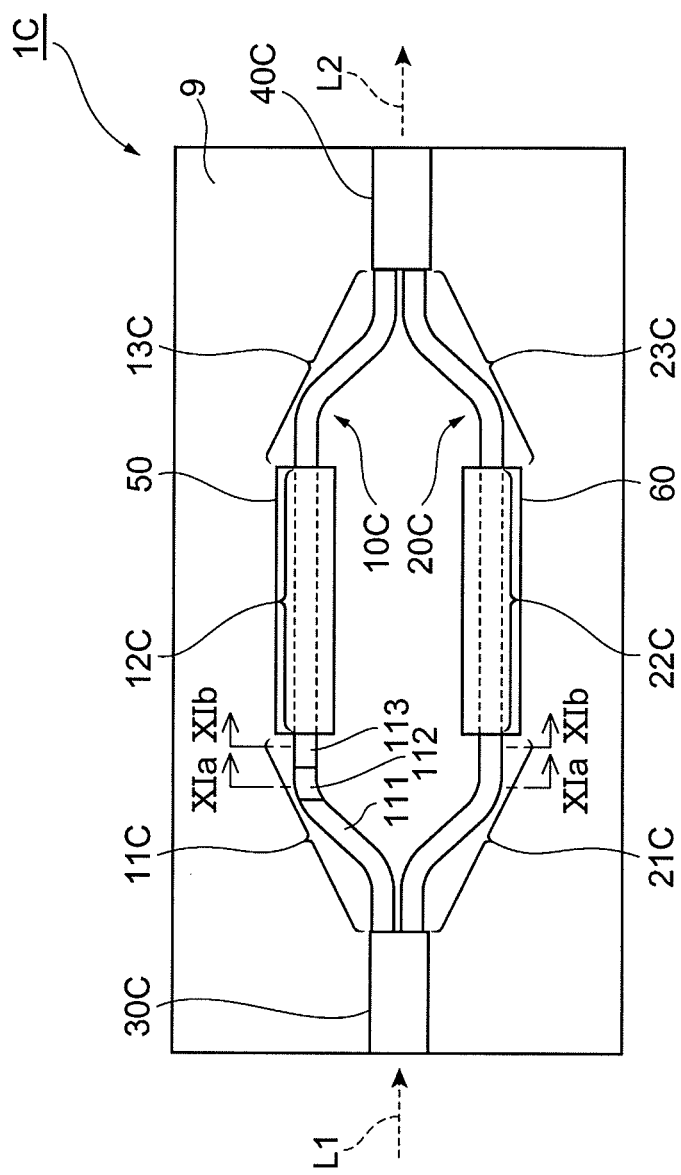
FIG. 10 is a plan view showing a structure of a Mach-Zehnder interferometer type optical modulator 1C which is a third embodiment of the semiconductor optical device of the present invention.
Figure 11A:
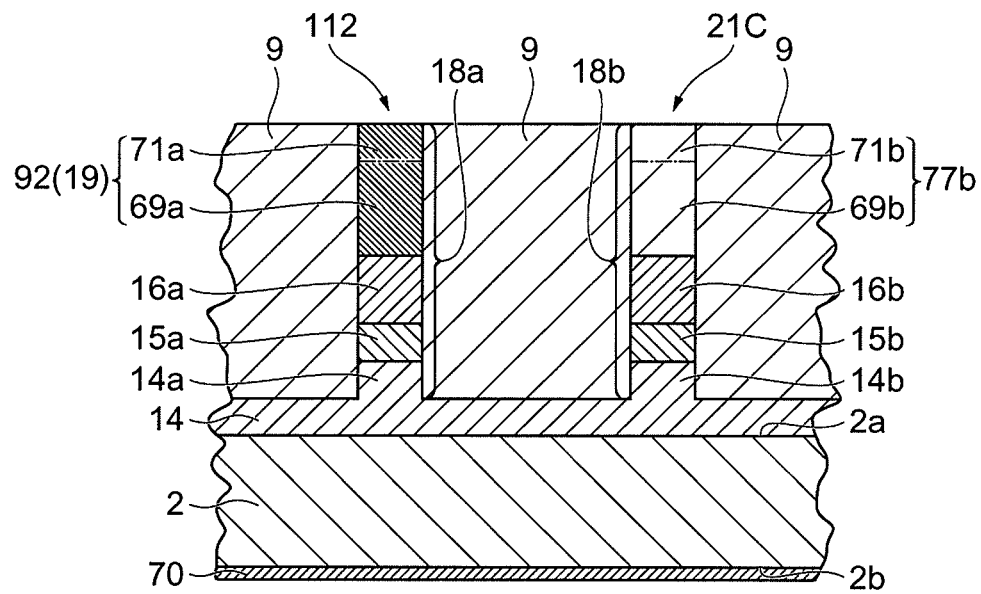
FIG. 11A is a cross-sectional view of the Mach-Zehnder interferometer type optical modulator 1C shown in FIG. 10 taken along line XIa-XIa and FIG. 11B is a cross-sectional view of the Mach-Zehnder interferometer type optical modulator 1C shown in FIG. 10 taken along line XIb-XIb.
Figure 11B:
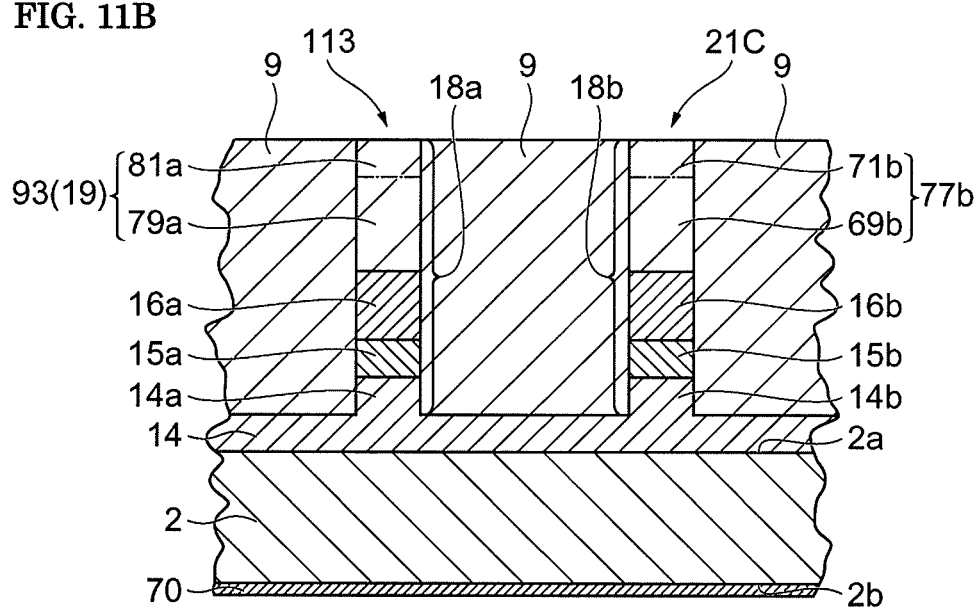

Another Mach-Zehnder interferometer type optical modulator is described below as a third embodiment of the semiconductor optical device according to the present invention. Referring to FIG. 10, a Mach-Zehnder interferometer type optical modulator 1C of this embodiment includes two optical waveguides 10C and 20C, an input optical coupler 30C, an output optical coupler 40C, and two upper electrodes 50 and 60. The optical waveguides 10C and 20C, the input optical coupler 30C, and the output optical coupler 40C are formed on a main surface 2a of an n-type semiconductor substrate 2 as shown in FIGS. 11A and 11B. The Mach-Zehnder interferometer type optical modulator 1C further includes a lower electrode 70 formed on a rear surface 2b of the n-type semiconductor substrate 2 (refer to FIGS. 11A and 11B).

The optical waveguide 10C is a first optical waveguide according to this embodiment and the optical waveguide 20C is a second optical waveguide according to this embodiment. The optical waveguides 10C and 20C extend between the input optical coupler 30C and the output optical coupler 40C and each have one end connected to the input optical coupler 30C and the other end connected to the output optical coupler 40C. The optical waveguides 10C and 20C are provided in parallel with each other in an extending direction.

The optical waveguide 10C includes a waveguiding section 11C, a phase shifting section 12C, and a waveguiding section 13C. The waveguiding section 11C, the phase shifting section 12C, and the waveguiding section 13C are aligned in that order in the waveguiding direction (the direction in which the optical waveguide 10C extends). The waveguiding section 11C is a first section according to this embodiment. The phase shifting section 12C is a second section according to this embodiment. The waveguiding section 13C is a third section according to this embodiment.

The optical waveguide 20C includes a waveguiding section 21C, a phase shifting section 22C, and a waveguiding section 23C. The waveguiding section 21C, the phase shifting section 22C, and the waveguiding section 23C are aligned in that order in the waveguiding direction (the direction in which the optical waveguide 20C extends). The waveguiding section 21C is a fourth section according to this embodiment. The phase shifting section 22C is a fifth section according to this embodiment. The waveguiding section 23C is a sixth section according to this embodiment.

The input optical coupler 30C branches incoming light L1 coming into the Mach-Zehnder interferometer type optical modulator 1C from outside to the optical waveguide 10C and the optical waveguide 20C. The output optical coupler 40C combines the light that has propagated through the optical waveguides 10C and 20C. The input optical coupler 30C and the output optical coupler 40C are each constituted by, for example, a MMI coupler.

The upper electrode 50 is formed on the phase shifting section 12C, and the upper electrode 60 is formed on the phase shifting section 22C.

The waveguiding sections 11C and 21C will now be described. Note that the phase shifting section 12C has the same structure as the phase shifting section 12 of the optical waveguide 10 shown in FIG. 2, and the phase shifting section 22C has the same structure as the phase shifting section 22 of the optical waveguide 20 shown in FIG. 2.

The waveguiding section 11C includes a first portion 111, a second portion 112, and a third portion 113. The first portion 111, the second portion 112, and the third portion 113 are aligned in that order in the waveguiding direction. Since the waveguiding section 11C includes a plurality of (three) portions sequentially aligned in the waveguiding direction, the upper cladding layer 19 (refer to FIGS. 11A and 11B) of the waveguiding section 11C also includes a plurality of semiconductor sections sequentially aligned in the waveguiding direction. In this embodiment, the upper cladding layer 19 includes a first semiconductor section corresponding to the first portion 111, a second semiconductor section 92 corresponding to the second portion 112, and a third semiconductor section 93 corresponding to the third portion 113. Note that the upper cladding layer 19 is a third cladding layer of this embodiment.

Referring to FIG. 11A, the second portion 112 differs from the waveguiding section 11 of the optical waveguide 10 shown in FIG. 3 in that the second semiconductor section 92 is provided instead of the upper cladding layer 17a. The second semiconductor section 92 includes a first cladding section 69a and a second cladding section 71a. The first cladding section 69a is disposed on the intermediate semiconductor layer 16a on the core layer 15a in this embodiment. The second cladding section 71a is disposed on the first cladding section 69a. The first cladding section 69a and the second cladding section 71a are composed of a semi-insulating semiconductor. In other words, the second semiconductor section 92 is composed of a semi-insulating semiconductor.

Referring to FIG. 11B, the third portion 113 differs from the waveguiding section 11 of the optical waveguide 10 shown in FIG. 3 in that the third semiconductor section 93 is provided instead of the upper cladding layer 17a. The third semiconductor section 93 includes a first cladding section 79a and a second cladding section 81a. The first cladding section 79a is disposed on the intermediate semiconductor layer 16a on the core layer 15a in this embodiment. The second cladding section 81a is disposed on the first cladding section 79a. The first cladding section 79a and the second cladding section 81a are composed of an undoped semiconductor. In other words, the third semiconductor section 93 is composed of an undoped semiconductor. The first portion 111 has the same structure as the third portion 113.

The waveguiding section 21C differs from the waveguiding section 21 of the optical waveguide 20 shown in FIG. 3 in that an upper cladding layer 77b is provided instead of the upper cladding layer 17b. The upper cladding layer 77b is a third cladding layer of this embodiment. The upper cladding layer 77b includes a first cladding section 69b and a second cladding section 71b. The first cladding section 69b is disposed on the intermediate semiconductor layer 16b on the core layer 15b in this embodiment. The second cladding section 71b is disposed on the first cladding section 69b. The first cladding section 69b and the second cladding section 71b are composed of an undoped semiconductor. In other words, the upper cladding layer 77b is composed of an undoped semiconductor. The waveguiding section 23C has the same structure as the waveguiding section 21C.

The waveguiding section 13C differs from the waveguiding section 11 shown in FIG. 3 in that an upper cladding layer composed of an undoped semiconductor is provided instead of the upper cladding layer 17a. The upper cladding layer is a third cladding layer of this embodiment.

The input optical coupler 30C differs from the input optical coupler 30 shown in FIG. 4 in that an upper cladding layer composed of an undoped semiconductor is provided instead of the upper cladding layer 27a composed of a semi-insulating semiconductor. The upper cladding layer is a third cladding layer of this embodiment. The output optical coupler 40C has the same structure as the input optical coupler 30C.

Operation of the Mach-Zehnder interferometer type optical modulator 1C is the same as the Mach-Zehnder interferometer type optical modulator 1A.

Among the upper cladding layer 19 of the waveguiding section 11C, the upper cladding layer of the waveguiding section 13C, the upper cladding layer 77b of the waveguiding section 21C, the upper cladding layer of the waveguiding section 23C, the upper cladding layer of the input optical coupler 30C, and the upper cladding layer of the output optical coupler 40C of the Mach-Zehnder interferometer type optical modulator 1C, the upper cladding layer 19 of the waveguiding section 11C is constituted by a first semiconductor section, a second semiconductor section 92, and a third semiconductor section 93. Among these semiconductor sections, only the second semiconductor section 92 is composed of a semi-insulating semiconductor. Other semiconductor sections and the upper cladding layers other than the second semiconductor section 92 of the upper cladding layer 19 are composed of an undoped semiconductor having a lower optical absorption than the semi-insulating semiconductor. Thus, the leakage current can be reduced, and optical absorption loss of the guided light is reduced compared to the structure in which the upper cladding layers of the waveguiding regions 11C, 13C, 21C, and 23C, the input optical coupler 30C, and the output optical coupler 40C are all composed of a semi-insulating semiconductor.

Figure 12:
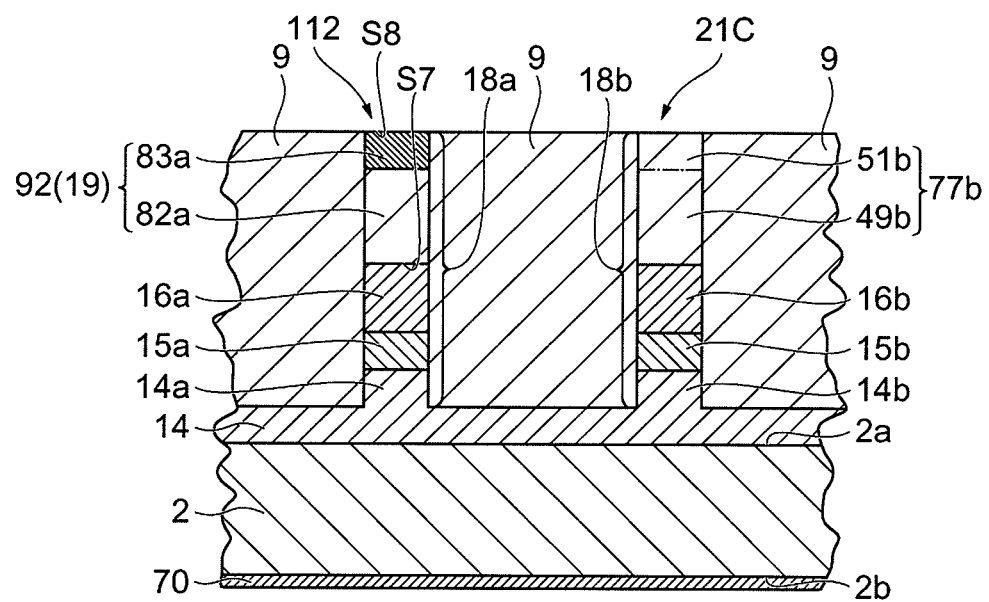
FIG. 12 is a cross-sectional view of a modification of the Mach-Zehnder interferometer type optical modulator 1C shown in FIG. 10 taken along line XIa-Xia.
Figure 13:
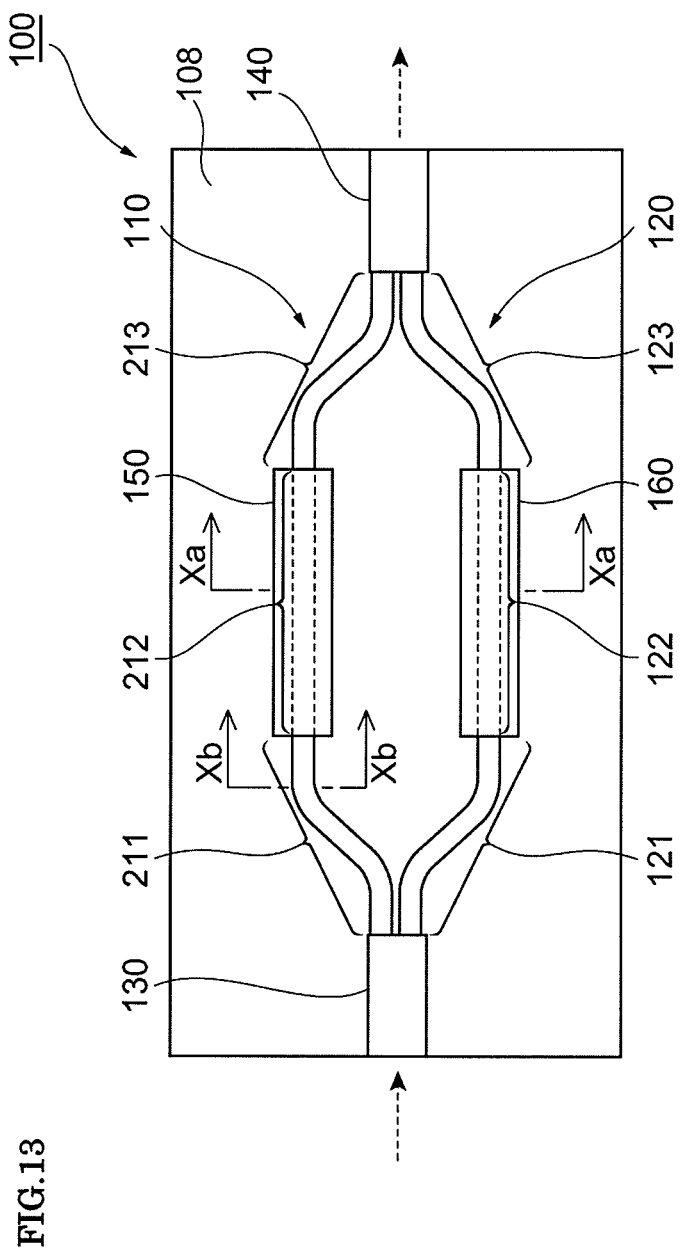
FIG. 13 is a plan view showing a structure of a npin structured Mach-Zehnder interferometer type optical modulator 100 which is an example of a Mach-Zehnder interferometer type optical modulator.
Figure 14A:
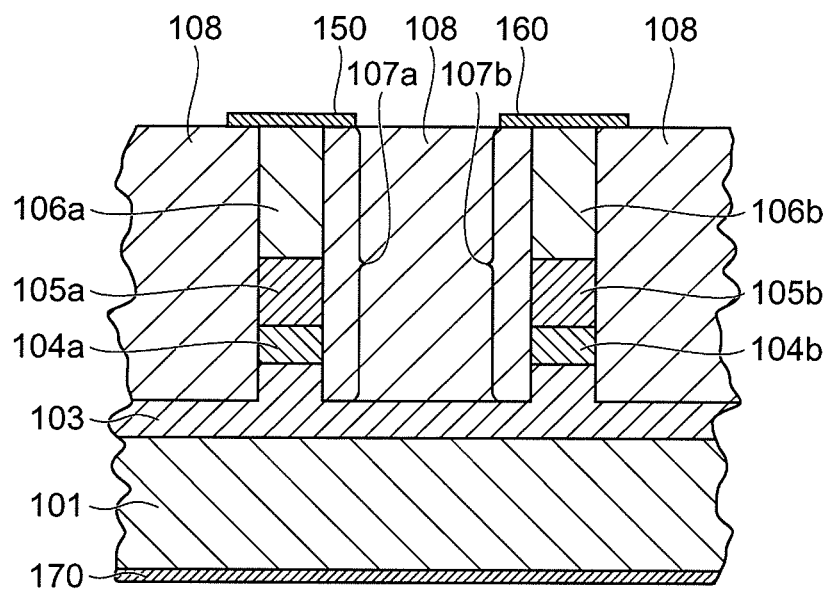
FIG. 14A is a cross-sectional view of the Mach-Zehnder interferometer type optical modulator 100 shown in FIG. 13 taken along line Xa-Xa and FIG. 14B is a cross-sectional view of the Mach-Zehnder interferometer type optical modulator 100 shown in FIG. 13 taken along line Xb-Xb.
Figure 14B:
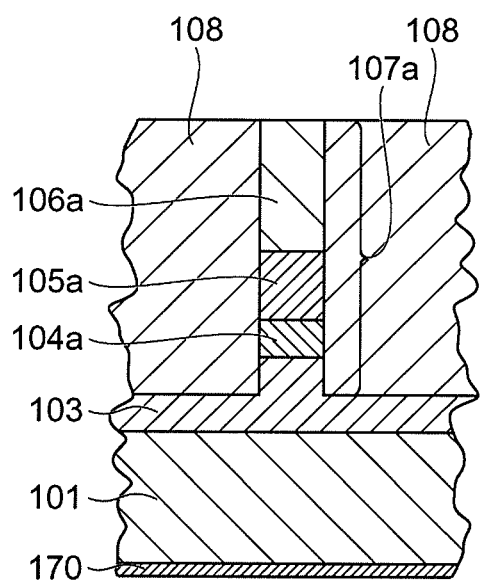

The second semiconductor section 92 can have the structure shown in FIG. 12. According to this structure, the second semiconductor section 92 includes a first cladding section 82a and a second cladding section 83a. The first cladding section 82a is disposed on the intermediate semiconductor layer 16a on the core layer 15a in this embodiment. The second cladding section 83a is disposed on the first cladding section 82a. The first cladding section 82a is composed of an undoped semiconductor and the second cladding section 83a is composed of a semi-insulating semiconductor. In other words, an undoped semiconductor constitutes a portion of the second semiconductor section 92 shown in FIG. 12, the portion being located on the core layer 15a-side and including an interface S7 with the intermediate semiconductor layer 16a. And a semi-insulating semiconductor constitutes another portion of the second semiconductor section 92, the another portion including a surface S8 opposite the interface S7. In this case, the propagation loss of the guided light can be reduced more reliably.

According to this embodiment, the upper cladding layer 19 of the waveguiding section 11C is constituted by a plurality (three) semiconductor sections and, of these sections, the second semiconductor section 92 includes a section composed of a semi-insulating semiconductor. However, the arrangement is not limited to this. Among the upper cladding layer 19 of the waveguiding section 11C, the upper cladding layer of the waveguiding section 13C, the upper cladding layer 77b of the waveguiding section 21C, the upper cladding layer of the waveguiding section 23C, the upper cladding layer of the input optical coupler 30C, and the upper cladding layer of the output optical coupler 40C, some of the upper cladding layers may be configured to include a plurality of semiconductor sections sequentially aligned in the waveguiding direction, and some of the plurality of semiconductor sections may be composed of a semi-insulating semiconductor.

In this embodiment, the layers and sections composed of an undoped semiconductor may be composed of an n-type semiconductor. As with the undoped semiconductor, an n-type semiconductor also has a small optical absorption compared to the semi-insulating semiconductor. Thus, optical absorption loss of the guided light is reduced compared to the structure in which the upper cladding layers of the waveguiding regions 11C, 13C, 21C, and 23C, the input optical coupler 30C, and the output optical coupler 40C are all composed of a semi-insulating semiconductor.

The intermediate semiconductor layers of the Mach-Zehnder interferometer type optical modulators 1A, 1B, and 1C of the first to third embodiments described above may be composed of a semiconductor other than a p-type semiconductor. For example, the intermediate semiconductor layers of the phase shifting section may be composed of a semi-insulating semiconductor. The intermediate semiconductor layers of the waveguiding sections, input optical couplers, and output optical couplers may be composed of a semi-insulating semiconductor, an n-type semiconductor, or an undoped semiconductor. In such a case, optical absorption loss and the like caused by a p-type semiconductor can be reduced.

Although the core layers of the waveguiding sections, the input optical couplers, and the output optical couplers of the Mach-Zehnder interferometer type optical modulators 1A, 1B, and 1C of the first to third embodiments are composed of an undoped semiconductor, the material is not limited to this. For example, the core layer of at least part of these sections may be composed of a semi-insulating semiconductor. Aforementioned semiconductor materials doped with transition metal such as Fe or Ti may be used as the semi-insulating semiconductor. In such a case, since the core layers exhibit high resistivity in addition to the upper cladding layers, electrical cross-talk between the optical waveguides of the Mach-Zehnder interferometer type optical modulators can be effectively reduced.

According to the Mach-Zehnder interferometer type optical modulators 1A, 1B, and 1C of the first to third embodiments, at least some of the upper cladding layers of the waveguiding sections and the upper cladding layers of the input optical coupler and the output optical coupler may be configured to include a first cladding section on the core layer, and a second cladding section composed of a semi-insulating semiconductor and disposed on the first cladding section.

Although MMI-couplers are used as the input optical couplers and the output optical couplers of the Mach-Zehnder interferometer type optical modulators 1A, 1B, and 1C of the first to third embodiments, Y-branch optical waveguides and the like may be used instead.

In the aforementioned embodiments, group III-V compound semiconductors doped with transition metal elements are described as an example of the semi-insulating semiconductor. However, the semi-insulating semiconductor is not limited to these. The semi-insulating semiconductor may be a semiconductor having resistivity increased by proton injection.

In the Mach-Zehnder interferometer type optical modulators 1A, 1B, and 1C of the first to third embodiments, the width of the mesa structures 8a and 8b of the phase shifting sections is preferably substantially the same as that of the mesa structures 18a and 18b of the waveguiding sections. The core layers 5a and 5b of the phase shifting sections preferably have substantially the same thickness and refractive index as those of the core layers 15a and 15b of the waveguiding sections. The n-type semiconductor, the p-type semiconductor, the undoped semiconductor, and the semi-insulating semiconductor preferably have substantially the same refractive index. In this case, the effective refractive index of the phase shifting sections can be made substantially the same as that of the waveguiding sections. Thus, scattering of the guided light at the interfaces between the phase shifting sections and the waveguiding sections can be suppressed. As a result, deterioration of the device characteristics can be avoided.

Although the optical waveguides of the Mach-Zehnder interferometer type optical modulators 1A, 1B, and 1C of the first to third embodiments each have a high mesa waveguide structure, the structure is not limited to this. For example, a ridge structure or a buried heterostructure (BH structure) may be employed.

Although Mach-Zehnder interferometer type optical modulators are described here as an example of the semiconductor optical device of the present invention, the structure of the present invention can be applied to any device that includes a plurality of optical waveguides, such as semiconductor laser array devices and integrated optical switches. In such a case also, electrical cross-talk between the waveguides and degradation of element characteristics can be suppressed as in these embodiments.

Although the principle of the present invention has been described heretofore through preferred embodiments, persons skilled in the art should recognize that alterations and modifications of details may be made without departing from the principle. All modifications and alterations which come within the scope of the claims and the spirit of the present invention are covered and protected.

What is claimed is:

1. A semiconductor optical device comprising:
a first optical waveguide including a first section, a second section, and a third section aligned in that order in a waveguiding direction;
a second optical waveguide including a fourth section, a fifth section, and a sixth section aligned in that order in the waveguiding direction;
an input optical coupler connected to one end of each of the first optical waveguide and the second optical waveguide; and
an output optical coupler connected to the other end of each of the first optical waveguide and the second optical waveguide,
wherein the first, second, and third sections of the first optical waveguide, the fourth, fifth, and sixth sections of the second optical waveguide, the input optical coupler, and the output optical coupler each include a first cladding layer composed of an n-type semiconductor and a core layer disposed on the first cladding layer, the core layer being composed of an undoped semiconductor,
the second section of the first optical waveguide and the fifth section of the second optical waveguide each include an intermediate semiconductor layer disposed on the core layer and a second cladding layer disposed on the intermediate semiconductor layer, the second cladding layer being composed of an n-type semiconductor,
the first and third sections of the first optical waveguide, the fourth and sixth sections of the second optical waveguide, the input optical coupler, and the output optical coupler each further include a third cladding layer on the core layer,
at least one of the third cladding layers included in the first and third sections of the first optical waveguide, the fourth and sixth sections of the second optical waveguide, the input optical coupler, and the output optical coupler includes a first cladding section disposed on the core layer and a second cladding section disposed on the first cladding section, and
the second cladding section is composed of a semi-insulating semiconductor.

2. The semiconductor optical device according to claim 1, wherein the input optical coupler and the output optical coupler are multimode interference (MMI) couplers or Y-branch optical couplers.

3. The semiconductor optical device according to claim 1, wherein the intermediate semiconductor layers of the second section of the first optical waveguide and the fifth section of the second optical waveguide are composed of a p-type semiconductor or a semi-insulating semiconductor.

4. The semiconductor optical device according to claim 1, wherein the third cladding layers of the first and third sections of the first optical waveguide, the fourth and sixth sections of the second optical waveguide, the input optical coupler, and the output optical coupler each include the first cladding section and the second cladding section, and
the first cladding section is composed of a semi-insulating semiconductor.

5. The semiconductor optical device according to claim 1, wherein the third cladding layers of the first and third sections of the first optical waveguide, the fourth and sixth sections of the second optical waveguide, the input optical coupler, and the output optical coupler each include the first cladding section and the second cladding section, and
the first cladding section is composed of an undoped semiconductor or an n-type semiconductor.

6. The semiconductor optical device according to claim 1, wherein some of the third cladding layers of the first and third sections of the first optical waveguide, the fourth and sixth sections of the second optical waveguide, the input optical coupler, and the output optical coupler each include a plurality of semiconductor sections aligned in the waveguiding direction,
some of the semiconductor sections are composed of a semi-insulating semiconductor,
the other semiconductor sections are composed of an undoped semiconductor or an n-type semiconductor, and
the other third cladding layers of the first and third sections of the first optical waveguide, the fourth and sixth sections of the second optical waveguide, the input optical coupler, and the output optical coupler are composed of an undoped semiconductor or an n-type semiconductor.

7. The semiconductor optical device according to claim 1, wherein some of the third cladding layers of the first and third sections of the first optical waveguide, the fourth and sixth sections of the second optical waveguide, the input optical coupler, and the output optical coupler each include a plurality of semiconductor sections aligned in the waveguiding direction,
some of the semiconductor sections each include the first cladding section and the second cladding section,
the first cladding section is composed of an undoped semiconductor or an n-type semiconductor,
the other semiconductor sections are composed of an undoped semiconductor or an n-type semiconductor, and
the other third cladding layers of the first and third sections of the first optical waveguide, the fourth and sixth sections of the second optical waveguide, the input optical coupler, and the output optical coupler are composed of an undoped semiconductor or an n-type semiconductor.

8. The semiconductor optical device according to claim 1, wherein the first optical waveguide and the second optical waveguide each have a mesa-structure that includes the core layer.

9. The semiconductor optical device according to claim 7, wherein side surfaces of the mesa structure are buried by a resin layer.

10. The semiconductor optical device according to claim 8, wherein the resin layer is composed of a polyimide resin or a benzocyclobutene (BCB) resin.

11. The semiconductor optical device according to claim 1, further comprising:
   a first electrode disposed on the second section of the first optical waveguide, and
   a second electrode disposed on the fifth section of the second optical waveguide.

12. The semiconductor optical device according to claim 1, wherein the semi-insulating semiconductor is a group III-V compound semiconductor doped with one transition metal element selected from Fe, Ti, Cr, and Co, and
   the group III-V compound semiconductor is one of InP, GaInAsP, AlGaInAs, and AlInAs.

* * * * *